(12) United States Patent
Conser

(10) Patent No.: US 11,648,884 B1
(45) Date of Patent: May 16, 2023

(54) MOUNTING APPARATUS TO SECURE AN ACCESSORY TO THE FRONT OF A VEHICLE

(71) Applicant: John David Conser, Benson, AZ (US)

(72) Inventor: John David Conser, Benson, AZ (US)

( * ) Notice: Subject to any disclaimer, the term of this patent is extended or adjusted under 35 U.S.C. 154(b) by 0 days.

(21) Appl. No.: 17/504,205

(22) Filed: Oct. 18, 2021

Related U.S. Application Data

(60) Provisional application No. 63/093,707, filed on Oct. 19, 2020.

(51) Int. Cl.
*B60R 9/06* (2006.01)

(52) U.S. Cl.
CPC ..................... *B60R 9/06* (2013.01)

(58) Field of Classification Search
CPC ........................................ B60R 9/06
USPC ......................................... 224/537
See application file for complete search history.

(56) References Cited

U.S. PATENT DOCUMENTS

| | | | | |
|---|---|---|---|---|
| 4,050,616 A * | 9/1977 | Mosow | ..................... | B60R 9/06 224/532 |
| 4,825,975 A * | 5/1989 | Symes | ..................... | B60R 3/007 182/159 |
| 5,685,112 A * | 11/1997 | Fara | ..................... | E04G 21/32 52/745.15 |
| 6,457,733 B1 * | 10/2002 | Hansen | ..................... | B60D 1/52 280/496 |
| 6,685,212 B1 * | 2/2004 | Penlerick | ..................... | B60D 1/143 280/495 |
| 6,902,183 B2 * | 6/2005 | Rodgers | ..................... | B60D 1/00 280/514 |
| 9,016,643 B2 * | 4/2015 | Sterling | ..................... | B60D 1/58 248/316.1 |
| 9,981,608 B1 * | 5/2018 | DoVale | ..................... | B60R 3/007 |
| 10,081,223 B2 * | 9/2018 | Allen | ..................... | B60D 1/58 |
| 2003/0047894 A1 * | 3/2003 | Raichlen | ..................... | B62B 1/12 280/47.27 |
| 2004/0130116 A1 * | 7/2004 | Glanert | ..................... | B60R 3/007 280/163 |
| 2007/0007073 A1 * | 1/2007 | Keller | ..................... | B60R 3/007 182/115 |
| 2017/0088058 A1 * | 3/2017 | Krishnan | ..................... | B60R 5/045 |
| 2017/0334347 A1 * | 11/2017 | Wilkins | ..................... | B60Q 1/18 |

* cited by examiner

*Primary Examiner* — Peter N Helvey
(74) *Attorney, Agent, or Firm* — Plager Schack LLP; Mark H. Plager; Kara Verryt

(57) ABSTRACT

A mounting assembly for removably securing accessories to a vehicle may include a pair of anchor blocks, each of the pair of anchor blocks including a medial face and a lateral face, wherein the lateral face of each anchor block is configured to engage with a respective tow hook on the vehicle; an elongate tie rod attached to and extending between the medial surfaces of the pair of anchor blocks; and a ratchet body assembly attached to the elongate tie rod. The elongate tie rod may be a telescopic tie rod and, thus, may have an adjustable length.

7 Claims, 4 Drawing Sheets

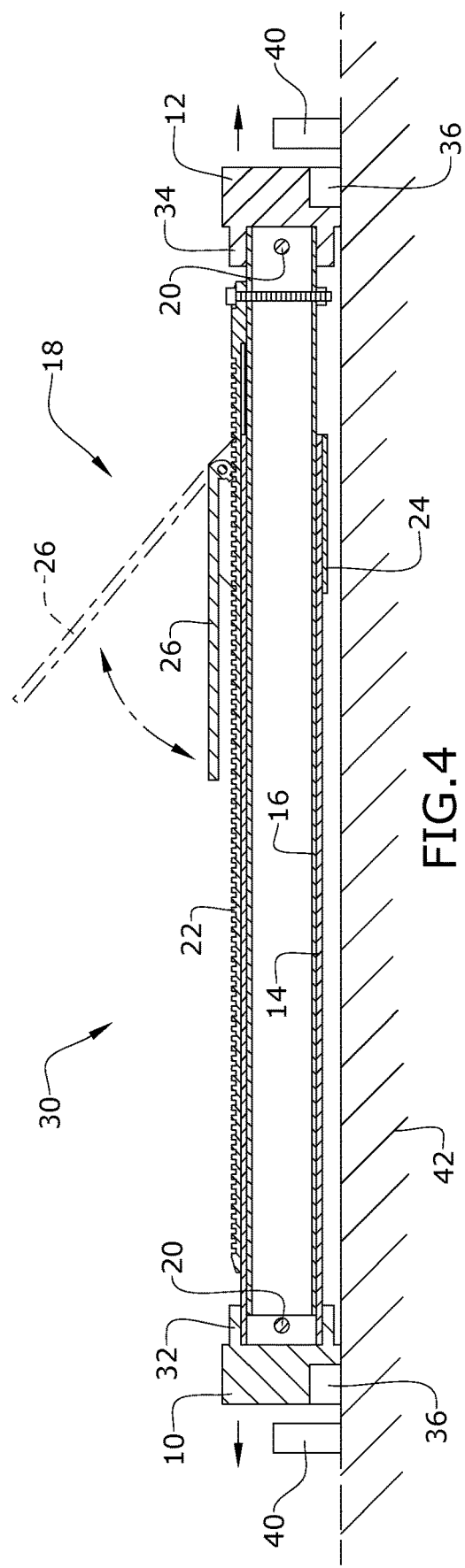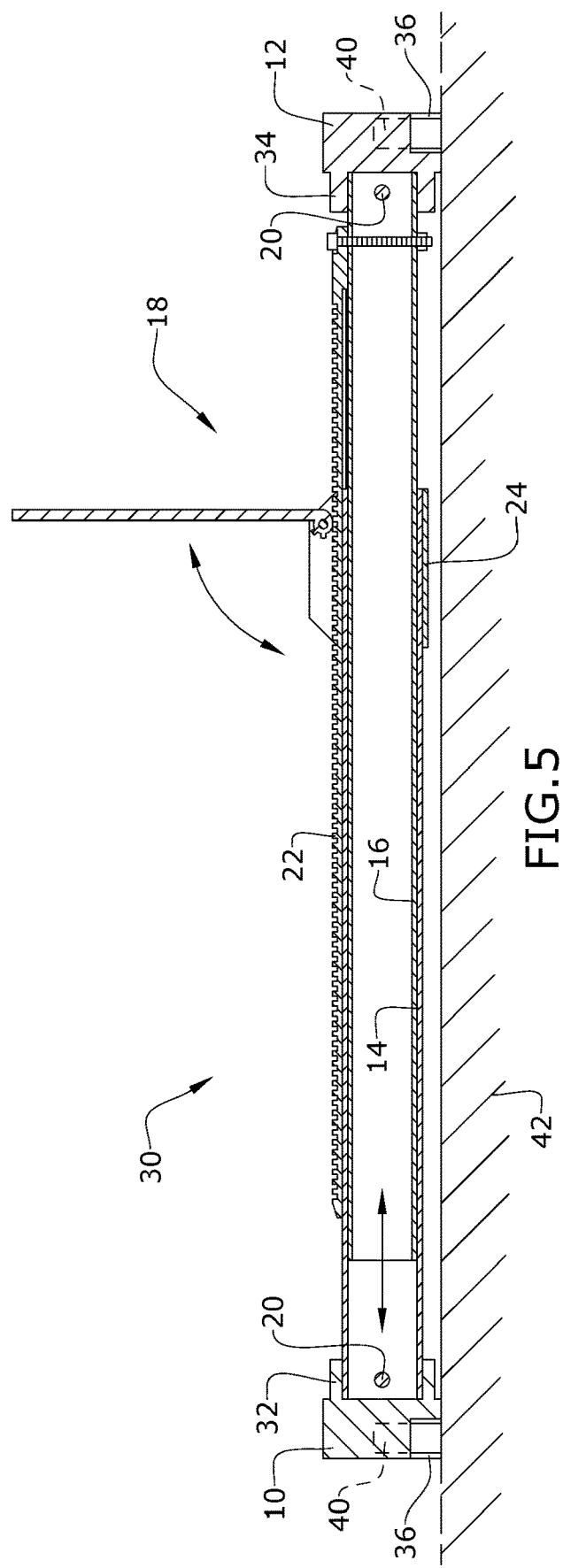

MOUNTING APPARATUS TO SECURE AN ACCESSORY TO THE FRONT OF A VEHICLE

RELATED APPLICATION

This application claims priority to provisional patent application U.S. Ser. No. 63/093,707 filed on Oct. 19, 2020, the entire contents of which is herein incorporated by reference.

BACKGROUND

The embodiments described herein relate generally to mounting apparatuses and, more particularly, to a mounting apparatus to secure an accessory to the front of a vehicle.

Accessories are mounted to vehicles to improve appearance or to add functionality. The attachment of such accessories is complicated and, conventionally, requires the use of many parts applied with tools, often requiring advanced skills and, thus, necessitating the vehicle owner to hire experienced mechanics. Additionally, many attachments require modifications of the vehicles to which they are applied. The multiplicity of parts and the difficulty of installation necessitate the permanent installation of attachment systems. Moreover, using multiple threaded fasteners, as is required by conventional mounting techniques, also presents the danger that the fasteners will loosen while installed on the vehicle and become dislodged.

Therefore, what is needed is a mounting apparatus that secures an accessory to the front of a vehicle that addresses the limitations of the prior art while also providing a mechanism for quickly connecting and disconnecting an accessory from existing tow hooks on the front of a vehicle.

SUMMARY

Some embodiments of the present disclosure include a mounting assembly for removably securing accessories to a vehicle. The mounting assembly may include a pair of anchor blocks, each of the pair of anchor blocks including a medial face and a lateral face, wherein the lateral face of each anchor block is configured to engage with a respective tow hook on the vehicle; an elongate tie rod attached to and extending between the medial surfaces of the pair of anchor blocks; and a ratchet body assembly attached to the elongate tie rod. The elongate tie rod may be a telescopic tie rod and, thus, may have an adjustable length.

BRIEF DESCRIPTION OF THE FIGURES

The detailed description of some embodiments of the invention is made below with reference to the accompanying figures, wherein like numerals represent corresponding parts of the figures.

FIG. 4 is a section view of one embodiment of the present disclosure, taken along line 4-4 in FIG. 2.

FIG. 5 is a section view similar to FIG. 4.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as an apparatus for mounting accessories to the front of a vehicle and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements and the following examples are presented as illustrative examples only.

Figure 1:
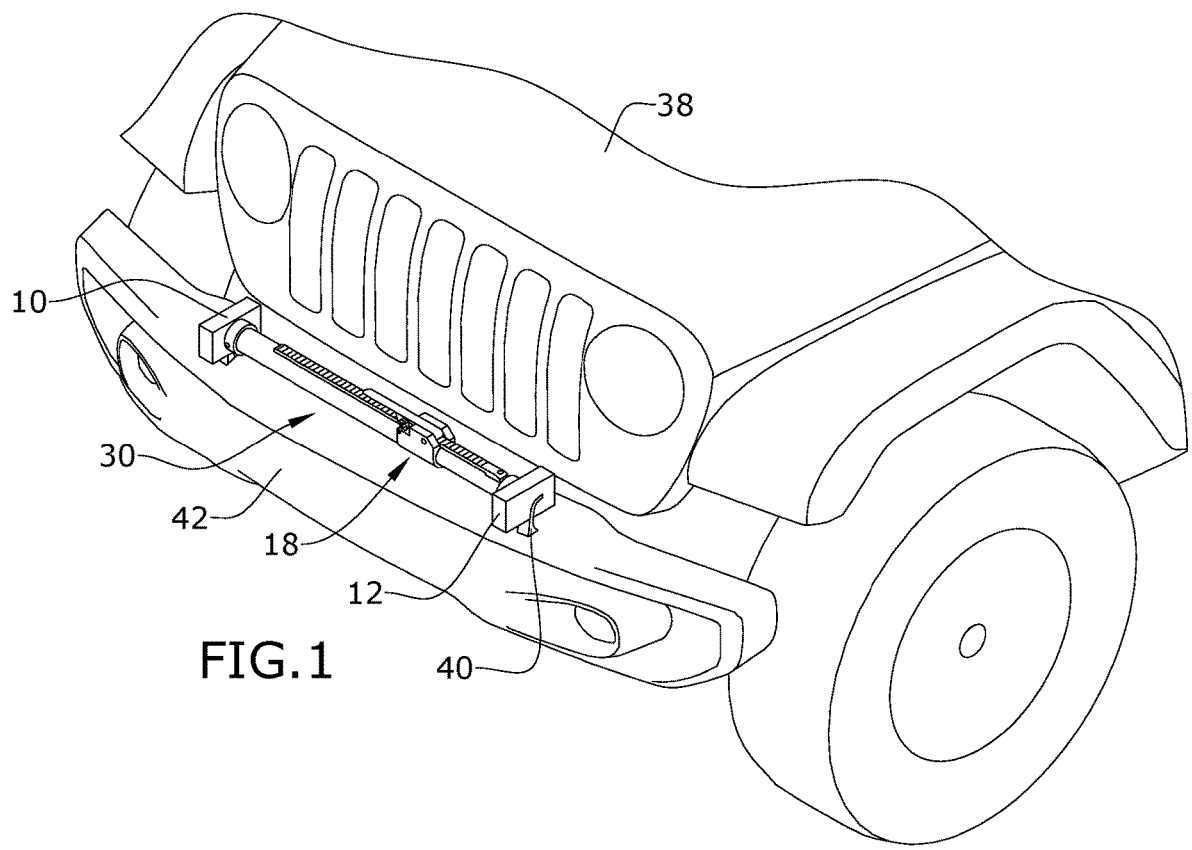
FIG. 1 is a perspective view of one embodiment of the present disclosure, shown in use.
Figure 2:
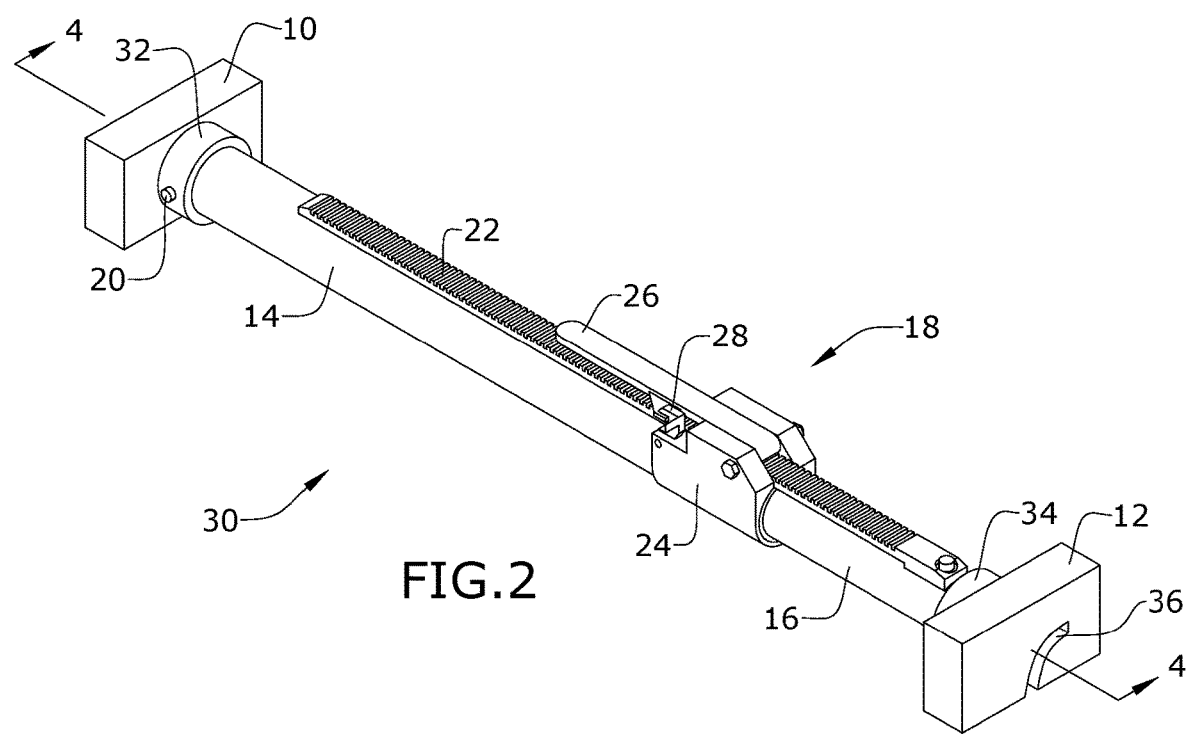
FIG. 2 is a perspective view of one embodiment of the present disclosure.
Figure 3:
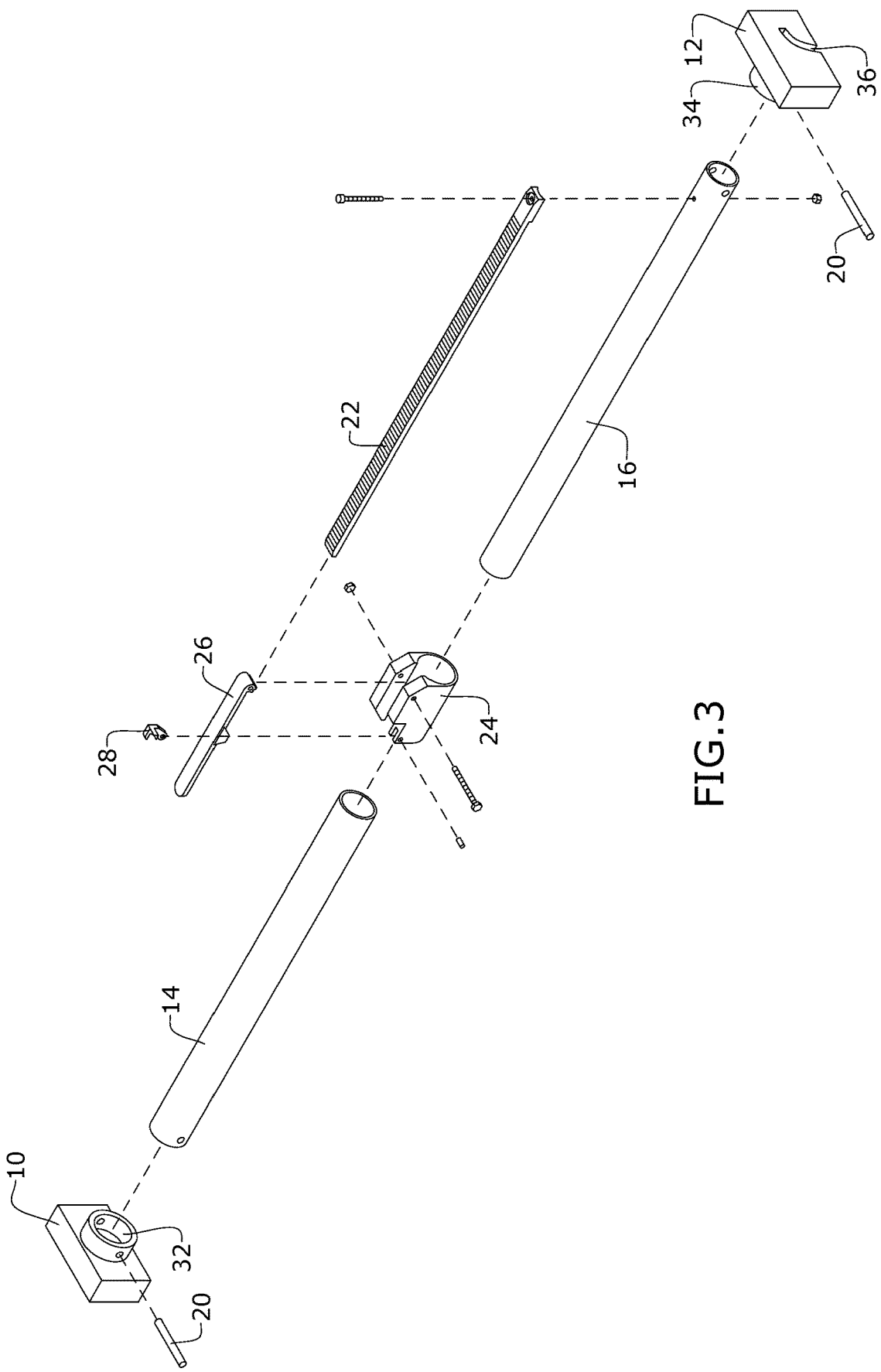
FIG. 3 is an exploded view of one embodiment of the present disclosure.
Figure 6:
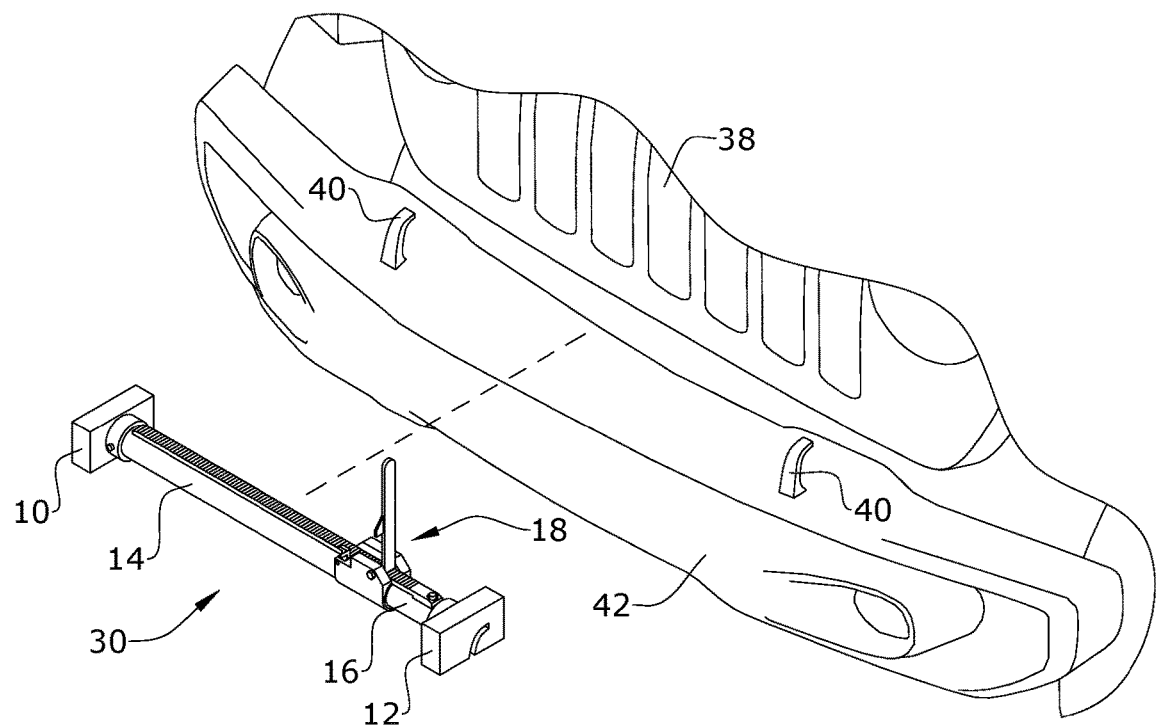
FIG. 6 is a perspective view of one embodiment of the present disclosure.
Figure 7:
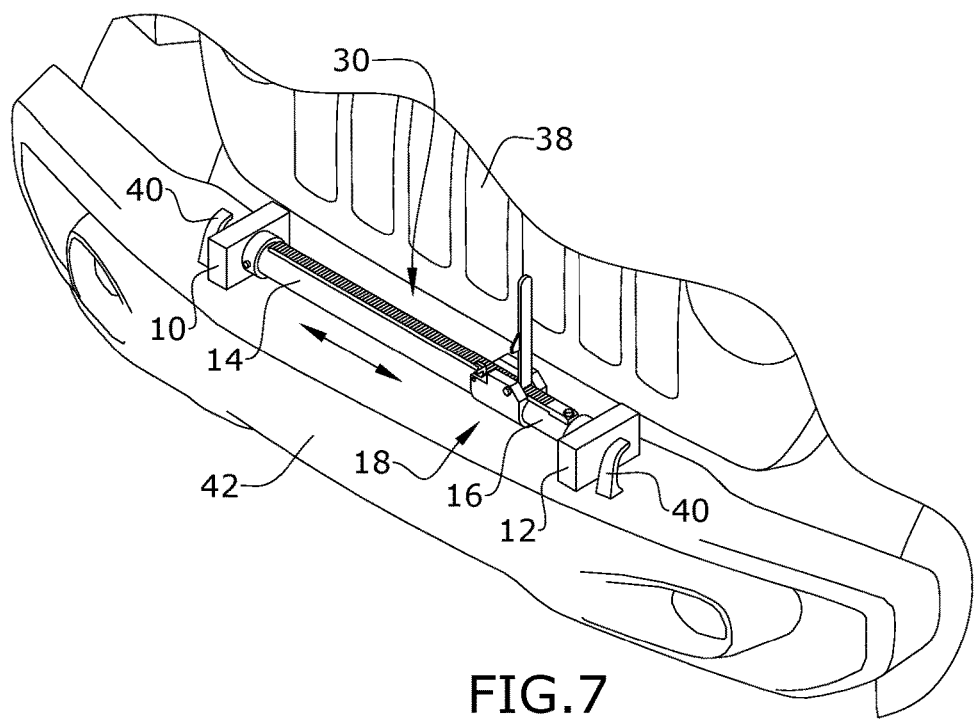
FIG. 7 is a perspective view of one embodiment of the present disclosure.

By way of example, and referring to FIGS. 1-7, some embodiments of the present disclosure include a mounting assembly 30 for securing accessories to a vehicle 38, such as to the front 42 of the vehicle 38. In embodiments, the mounting assembly 30 may comprise a pair of anchor blocks, such as a right hand anchor block 10 and a left hand anchor block 12, wherein each of the pair of anchor blocks includes a medial face and a lateral face and wherein the lateral face of each anchor block is configured to engage with a respective tow hook 40 on the vehicle 38; an elongate tie rod attached to and extending between the medial surfaces of the pair of anchor blocks; and a ratchet body assembly 18 attached to the elongate tie rod. In some embodiments, the elongate tie rod may comprise a smaller tie rod tube 16 telescopically engaged with a larger tie rod tube 14 and, thus, the elongate tie rod may have an extendible length. In embodiments, the lateral faces of each of the anchor blocks may comprise a tow hook channel 36 to accept at least a portion of the tow hook 40, and the medial faces may each comprise a tie rod protuberance or socket sized to accept an end of the tie rod. The mounting apparatus 30 may be configured to facilitate the attachment and detachment of an accessory to the existing tow hooks 40 on a vehicle 38. As such, no modifications to the vehicle 38 may be necessary to use the mountain assembly 30 of the present disclosure. Moreover, the mounting assembly 30 may be attached and detached by an unskilled individual.

As shown in the Figures and as described above, a lateral face of each of the anchor blocks may include a channel 36 formed therein, the channel 36 sized and positioned to accept a tow hook 40 therein. For example and as shown in the Figures, the tow hook channel 36 may be a curved channel extending upward from a bottom surface of the anchor block toward a central portion of the anchor block. As also shown in the Figures and as described above, the medial faces of each of the anchor blocks may comprise a formed protuberance or socket bored therein, wherein each of the protuberances are sized to accept a free end of the elongate tie rod. Thus, in some embodiments, the right hand anchor block 10 may be designed to be fitted over the right-side factory vehicle tow hook 40 with the tow hook 40 inserted into the formed tow hook channel 36 on the lateral face of the right hand anchor block 10. The medial face of the right hand anchor block 10 may include a larger protuberance 32 bored to accept the free end of the larger tie rod tube 14, wherein the larger tie rod tube 14 may be secured to the right hand anchor block 10 using a pin 20, which may be driven into a perpendicularly bored hole in both the right hand anchor block 10 and the larger tie rod tube 14. The left hand anchor block 12 may be essentially a mirror image of the right hand anchor block 10 and, thus, may engage with the left side tow hook 40. The protuberance on the medial face of the left hand side anchor block 12 may comprise a smaller protuberance 34 and may be sized to accommodate an opposite end of the elongate tie rod, such as a free end of the smaller tie rod tube 16. While this orientation is shown in the Figures, it is also envisioned that the anchor blocks may be reversed such that the left hand anchor block includes a larger protuberance than the right hand anchor block to accommodate an elongate tie rod with an opposite orientation.

As mentioned above, the ratchet body assembly 18 may be secured to the elongate tie rod tube. As shown in the Figures, the ratchet body assembly 18 may comprise a gear rack 22, a ratchet body 24, a securing handle 26, a locking pawl 28, and a securing handle bolt. As shown, the gear rack 22 may be attached to the elongate tie rod, such as to the smaller tie rod tube 16 using a fastener, such as a socket head securing screw and a self-locking nylon insert nut. The gear rack 22 may slide into the ratchet body 24, which may encircle the elongate tie rod, and may be engaged by gear teeth on the ratchet body end of the securing handle 26. The securing handle 26 may be locked in an engaged position by the locking pawl 28. The securing handle bolt may attach the securing handle to the ratchet body 24.

The locking pawl 28 may be released by pushing against it and disengaging it from the securing handle 26. The released securing handle 26 may then be raised, as shown in FIG. 4, and the feat teeth of the handle 26 may disengage from teeth on the gear rack 10. Thus, the mounting assembly 30, once shortened, may be placed between a pair of vehicle tow hooks 40, as shown in FIG. 4. The right hand anchor block 10 may be positioned to accept the right hand hook 40 in the tow hook channel 36, and the smaller tie rod tube 16 may be telescopically extended outward from the larger tie rod tube 14, thus lengthening the mounting assembly 30, such that the left hand anchor block 12 is positioned to engage with the left hand tow hook 36. Specifically, the securing handle 26 may be lowered, and the engagement of its teeth with the gear rack 22 may further lengthen the mounting assembly 30, guising the left hand anchor block 12 onto the left hand tow hook 40, as shown in FIG. 5. Finally, the securing handle 26 may be lowered to fully engage both the gear rack 22 and the locking pawl 28 to fix the final engaged length of the mounting assembly 30. Removing the mounting assembly 30 is achieved by reversing installation. As such, installation and removal of the mounting assembly 30 requires no vehicle modification and does not require the use of any tools or specialized skills.

The mounting assembly 30 of the present disclosure may be combined with other assemblies to product tow bar attachments, bicycle carriers, front or rear cargo carriers, light bars, brush guards, protective grills, winch mounts, bumper covers, combinations thereof, and the like. For example, the mounting assembly 30 may be used to quickly attach rigging for heavy lift applications.

The mounting assembly 30 of the present disclosure may have any desired or necessary shape and size. Moreover, the mounting apparatus 30 may be made of any suitable materials and assembled using any known methods.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A mounting assembly for removably securing accessories to a vehicle, the mounting assembly comprising:
   a pair of anchor blocks, each of the pair of anchor blocks including a medial face and a lateral face, wherein the lateral face of each anchor block is configured to engage with a respective tow hook on the vehicle;
   an elongate tie rod attached to and extending between the medial faces of the pair of anchor blocks, the elongate tie rod comprising a smaller tie rod tube telescopically engaged with a larger tie rod tube; and
   a ratchet body assembly attached to the elongate tie rod, the ratchet body assembly comprising:
   a gear rack attached to the smaller tie rod tube;
   a ratchet body encircling the elongate tie rod;
   a securing handle pivotally attached to the ratchet body; and
   a locking pawl operatively attached to the securing handle to lock the securing handle in an engaged position on the gear rack.

2. The mounting assembly of claim 1, wherein the lateral faces of each of the anchor blocks comprise a tow hook channel sized to accept at least a portion of the tow hook.

3. The mounting assembly of claim 2, wherein the tow hook channel is a curved channel that extends upward from a bottom surface of the anchor block toward a central portion of the anchor block.

4. The mounting assembly of claim 1, wherein the medial faces each comprise a tie rod protuberance sized to accept an end of the elongate tie rod.

5. The mounting assembly of claim 4, wherein:
   the pair of anchor blocks comprise a right hand anchor block and a left hand anchor block;
   the elongate tie rod comprises a smaller tie rod tube telescopically engaged with a larger tie rod tube;
   the lateral face of the right hand anchor block comprises a larger tie rod protuberance sized to accept a free end of the larger tie rod tube; and
   the lateral face of the left hand anchor block comprises a smaller tie rod protuberance sized to accept a free end of the smaller tie rod tube.

6. A mounting assembly for removably securing accessories to a vehicle, the mounting assembly comprising:
   a pair of anchor blocks, each of the pair of anchor blocks including a medial face and a lateral face, wherein the lateral face of each anchor block is configured to engage with a respective tow hook on the vehicle;
   an elongate tie rod attached to and extending between the medial faces of the pair of anchor blocks; and
   a ratchet body assembly attached to the elongate tie rod, wherein:
   the medial faces each comprise a tie rod protuberance sized to accept an end of the elongate tie rod;

the pair of anchor blocks comprise a right hand anchor block and a left hand anchor block;

the elongate tie rod comprises a smaller tie rod tube telescopically engaged with a larger tie rod tube;

the lateral face of the right hand anchor block comprises a larger tie rod protuberance sized to accept a free end of the larger tie rod tube; and the lateral face of the left hand anchor block comprises a smaller tie rod protuberance sized to accept a free end of the smaller tie rod tube.

7. A mounting assembly for removably securing accessories to a vehicle, the mounting assembly comprising:

a pair of anchor blocks, each of the pair of anchor blocks including a medial face and a lateral face, wherein the lateral face of each anchor block is configured to engage with a respective tow hook on the vehicle;

an elongate tie rod attached to and extending between the medial faces of the pair of anchor blocks; and a ratchet body assembly attached to the elongate tie rod, wherein:

the medial faces each comprise a tie rod protuberance sized to accept an end of the elongate tie rod;

the pair of anchor blocks comprise a right hand anchor block and a left hand anchor block;

the elongate tie rod comprises a smaller tie rod tube telescopically engaged with a larger tie rod tube;

the lateral face of the right hand anchor block comprises a smaller tie rod protuberance sized to accept a free end of the smaller tie rod tube; and the lateral face of the left hand anchor block comprises a larger tie rod protuberance sized to accept a free end of the larger tie rod tube.

\* \* \* \* \*